United States Patent [19]

Brooks

[11] E Patent Number: Re. 32,679

[45] Reissued Date of Patent: May 31, 1988

[54] PRESSURE AIR MANIFOLD AND OUTLETS SYSTEM FOR GRAIN HEADER OR HARVESTER CUTTING PLATFORMS

[75] Inventor: Donald G. Brooks, Scarborough, Australia

[73] Assignee: Harvestaire Pty. Ltd., Australia

[21] Appl. No.: 781,119

[22] Filed: Sep. 26, 1985

Related U.S. Patent Documents

Reissue of:

[64] Patent No.: 4,406,112
Issued: Sep. 27, 1983
Appl. No.: 325,887
Filed: Nov. 30, 1981

[30] Foreign Application Priority Data

Mar. 3, 1981 [AU] Australia ..... PE7820

[51] Int. Cl.[4] ..... A01D 57/22

[52] U.S. Cl. ..... 56/12.9; 56/13.3;DIG. 8

[58] Field of Search ..... 56/12.8, 12.9, 13.1, 56/13.2, 13.3, 13.4, 11.9, DIG. 8

[56] References Cited

U.S. PATENT DOCUMENTS

| | | | |
|---|---|---|---|
| 859,602 | 7/1907 | Green | 56/296 |
| 1,178,419 | 4/1916 | Shorten | 56/438 |
| 1,794,658 | 3/1931 | Walsh | 56/219 |
| 1,900,269 | 3/1933 | Altgelt | 56/12.9 |
| 2,501,810 | 3/1950 | Checchia | 12/123 |
| 2,502,810 | 4/1950 | Waters | 56/328 |
| 2,670,586 | 3/1954 | Phillips | 56/158 |
| 2,710,516 | 6/1955 | Kaesemeyer, Jr. et al. | 56/158 |
| 2,718,744 | 9/1955 | Phillips | 56/158 |
| 2,734,331 | 2/1956 | Phillips | 56/296 |
| 2,737,006 | 3/1956 | Klingler | 56/158 |
| 3,165,874 | 1/1965 | Osteen | 56/23 |
| 3,193,995 | 7/1965 | Miller | 56/21 |
| 3,581,483 | 6/1971 | Kohl et al. | 56/327 |

FOREIGN PATENT DOCUMENTS

| | | | |
|---|---|---|---|
| 624215 | 8/1961 | Italy | 56/11.9 |

*Primary Examiner*—Paul J. Hirsch
*Attorney, Agent, or Firm*—Kinney & Lange

[57] ABSTRACT

An improved pressure air manifold and outlets system for grain header or harvester cutting platforms comprising a manifold which extends across and above the cutting platform, the manifold being adjustable for height position and angularity and being provided with a plurality of relatively narrow shaped outlet tubes which depend from the manifold and which terminate nominally above the cutter bar of the cutting platform, each outlet tube being directed to discharge pressure air substantially in a rearward direction also some air in a lateral direction to form a continuous curtain of air and a blower to impart an air flow through the manifold to discharge through the outlet tubes.

21 Claims, 2 Drawing Sheets

PRESSURE AIR MANIFOLD AND OUTLETS SYSTEM FOR GRAIN HEADER OR HARVESTER CUTTING PLATFORMS

Matter enclosed in heavy brackets [ ] appears in the original patent but forms no part of this reissue specification; matter printed in italics indicates the additions made by reissue.

This invention relates to an improved pressure air manifold and outlets system for a grain header or harvester cutting platform, of the type having a frame, a cutter bar assembly and a feed auger.

BACKGROUND OF THE INVENTION

It has been known for many years that if a grain harvester or header cutting platform is fitted with a low pressure centrifugal blower or compressor and manifold, having a number of outlet tubes the openings of which face rearwardly and are situated forwardly of the cutter bar assembly, the cut crop can be assisted in its movement over the cutting platform and into the feed auger at the rear end thereof. This arrangement is intended to eliminate the need for a reel on "open" machines or the knife auger or flail on "closed" front headers, but the system has not come into use because of the difficulty of satisfactorily transporting the cut crop to the main throat of the machine for further processing.

Another difficulty which has been encountered has been a very considerable loss which has been occasioned on prior art machines wherein the air discharge tubes are positioned forwardly of the cutter bar assembly, due to "shatter" of the crop if harvested under dry conditions. For example, in the U.S. Pat. No. 2,670,586 (C. M. Phillips) there is described and illustrated a pneumatic attachment having pipes which depend from a manifold and terminate at their lower ends in fan shaped air nozzles. These are located forwardly of a cutter bar assembly, and in use under very dry conditions would so interfere with a standing crop as to cause considerable loss due to "tailing in" by forcing the crop to go under the fan shaped nozzle and to "shatter". However it is deemed desirable to harvest crops under dry conditions to ensure a low moisture content of the grain, and at the time of writing this specification, official figures in Australia indicate an average loss of about $8.00 per acre (about $20.00 per hectare) in certain type crops due to the crop being shattered and/or lost over the front end of the cutting platform, even without the use of such devices in front of the cutter bar assembly. This loss is still further increased if there are relativly large obstructions to the crop forward of the cutter bar assembly, for example, as illustrated in said U.S. Pat. No. 2,670,586, and much of the shattered "tailed in" or lost crop is wasted by not passing through the harvester or header machine.

The main object of this invention therefore is to provide an improved system wherein use is made of an air manifold and outlet relatively narrow tubes extending therefrom, arranged and shaped in such a way as to assist the cutting and transporting of the headed crop across the cutting platform of a grain header or harvester so effectively that the need is abolished for use of a reel, and the loss due to shattering of the crop or of grain heads falling over the front of the cutting platform is substantially reduced.

BRIEF SUMMARY OF THE INVENTION

Briefly in this invention a pressure air manifold and outlets system for a grain header or harvester utilises a manifold which extends across and above a cutting platform of the machine, the manifold being adjustable for height, and being provided with a plurality of outlet tubes which depend from the manifold and which terminate nominally above the cutter bar assembly each shaped outlet tube spouts being directed to discharge in a rearward and part lateral direction, and a blower to impart an air flow through the manifold to discharge through the outlet tubes.

With this arrangement, the crop is severed by the cutter bar as it is being subject to the air blast from the shaped outlet tubes, and any shattering of the crop due to the action of the cutter bar assembly will not result in such a heavy loss as occasioned by previously known machines, some at least of the shattered heads being entrained in the air flow. Particularly if the air blast is at high velocity, some of the air in front of the manifold and outlets systems will be entrained with the airblast and it has been found that the crop is much more effectively cut and transported with much less loss than with previously proposed machines.

Another of the problems which has been encountered heretofore has been the loss due to the cut crop being directed solely in a rearward direction without any assistance in change of direction, and some of the particulate portions of the headed crop will bounce off the hard surfaces of the cutter platform and be lost, and to still further improve the efficiency of the device, in one embodiment the outlet tubes are so arranged that the air being discharged therefrom has a lateral component of movement directing the headed crop at least partially in a lateral direction which assists the action of the feed auger and is found to avoid bunching and thinning. It also results in a much smoother flow of crop through the remainder of the grain header or harvester, and thereby more efficient threshing.

Experiments have indicated that one of the problems encountered with previously proposed pneumatic attachments has been the relatively low velocity of the air streams issuing from the outlet tubes coupled with an interrupted or fluctuating air curtain across the knife has been insufficient to ensure effective transport of the headed grain, and in one embodiment of the invention, air is discharged at a pressure of at least twelve inches or 300 mm water gauge (at about 40 m per second), and preferably at more than 400 mm pressure gauge (170 feet per second or 50 m per second).

More specifically, in this invention, an improved pressure air manifold and outlet system for a grain header or harvester cutting platform having a frame, a cutter bar assembly and a feed auger, comprises:

a pair of support arms projecting forward, one from each end of the cutting platform, a manifold extending across and above the cutting platform, pivot means joining the front ends of said arms to said manifold and the rear ends of said arms to said header frame, and elevating means coupling at least one of said arms to said header frame, a plurality of outlet tubes depending from said manifold and terminating nominally above said cutter bar assembly, each said shaped outlet tube spout being directed to discharge in a rearward direction and also in a lateral direction to collectively form a continuous air curtain, and a blower, drive means coupled to the blower, and conduit means coupling said blower to said manifold such that upon blower operation said outlet tubes discharge air rearwardly and laterally over the cutting platform towards the auger.

BRIEF SUMMARY OF THE DRAWINGS

An embodiment of the invention is described hereunder in some detail with reference to and is illustrated in the accompanying drawings in which.

DETAILED DESCRIPTION OF THE PREFERRED EMBODIMENT

Figure 1:
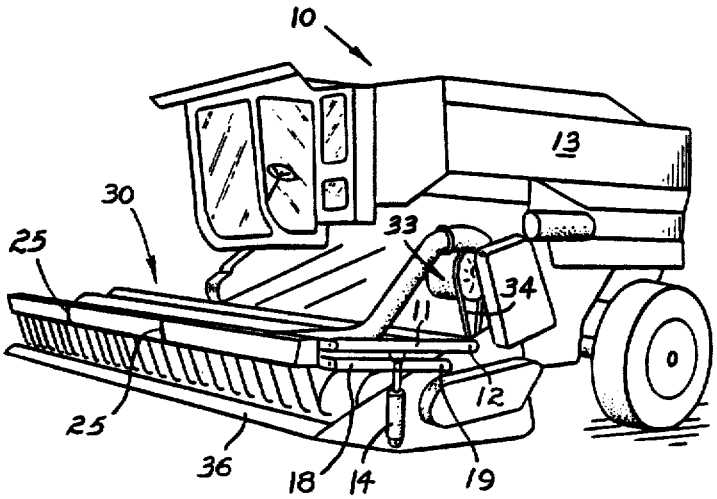
FIG. 1 is a perspective view of a grain header or harvester machine having the pressure air manifold and outlets system of this invention secured thereto.
Figure 2:
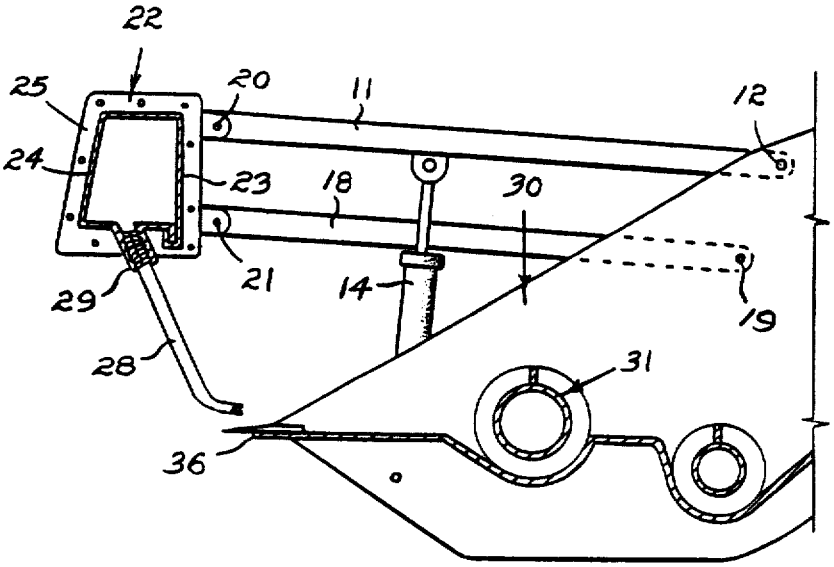
FIG. 2 is an enlarged central cross section showing the air manifold and outlets system illustrated in FIG. 1, but in more detail.

In the illustrated embodiment, a grain header or harvester machine 10 is provided with a support arm 11 at each end pivotted with a respective pivot 12 to the frame 13 of the grain header 10, and projecting forwardly therefrom. At each end there is also provided an elevating cylinder 14, and the arrangement thus far described is standard for the machine shown, the two arms 11 normally carrying between them a reel which is rendered unnecessary by this invention.

In this invention a second forwardly projecting arm 18 substantially parallel to the support arm 11 is pivotted at its rear end with a pivot 19 to the frame 13, and the two arms at each end are pivotted with respect to pivots 20 and 21 to a relatively large transversely extending manifold 22. This arrangement controls tilting of the manifold during raising or lowering. The manifold 22 is provided with at least one vertically extending wall 23 which imparts considerable strength. It should be noted that if the machine is driven at high speed over rough terrain, the manifold 22 is subject to high inertia forces and it is necessary to ensure the construction is sufficiently strong to withstand such forces. The vertical wall 23 and the near vertical front wall 24 are effective in achieving this result.

The manifold 22 is constructed from three portions which are bolted together, the portions being joined with contiguous face to face flanges 25, this arrangement greatly facilitates handling of the otherwise very bulky manifold in transport from a store to a farm.

The manifold 22 is provided with a plurality of depending outlet tubes 28, each threadably engaging a sleeve 29 at the upper end of the tube 28, the thread in this embodiment being of the tapered type so that the outlet tubes can be oriented to best assist the transport of discrete material over the cutting platform 30 of the header 10, and are unlikely to be dislodged. In the illustrated example, there is a central throat (not shown) and the feed auger 31 feeds towards that throat, one part of the auger having a left hand spiral and the other a right hand spiral. By correct orientation of the outlet tubes 28, an initial lateral component of movement can be imparted to the severed grain heads as they move rearwardly over the cutting platform 30. This is found to be very effective in reducing bunching or thinning and providing a smooth even flow of grain through the machine.

The machine is provided with a blower 33 driven by a driving belt 34, and the type of blower, speed of rotation and the conduit sizes are so adjusted that there exists in the manifold 22 a pressure which exceeds twelve inches or 300 mm of water gauge (*0.43 pounds/-square inch*), this corresponding with a discharge rate of about 40 meters per second (*131.2 feet per second*) from the outlet tubes 28. In some instances it is desirable to arrange baffles within the manifold to improve consistency of flow rate through the outlet tubes 28. The manifold ends can be made removable to facilitate manifold cleaning. It is in fact preferred that much higher pressures and speeds be used, and for average light conditions the minimum pressure should be in the order of 400 mm of water gauge (*0.57 pounds/square inch*) which corresponds to about 50 meters per second (*164 feet per second*) discharge rate, while for heavier crops, a minimum of 500 mm water pressure (*0.71 pounds/-square inch*) in the manifold is deemed necessary, with a corresponding high increase in discharge velocity. The feature of a high speed air blast discharging from the shaped spouts of outlet tubes 28, together with the feature of having the outlet tubes 28 terminating at their outlet ends adjacent the cutter bar assembly 36, results in an effective machine whereas prior art machines have been substantially ineffectual for handling a range of crop densities, due primarily to an uneven air curtain and/or lack of pressure and volume resulting in "tailing in", crop falling sideways, shattering and head loss over the front of the cutting platform.

Figure 3:
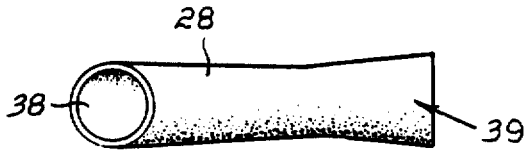
FIG. 3 is a fragmentary plan view of an outlet tube.
Figure 4:
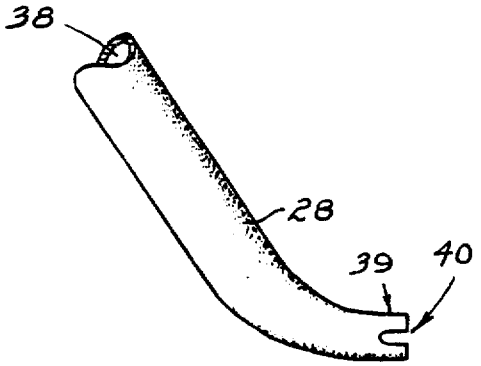
FIG. 4 is a side elevation of FIG. 3.
Figure 5:
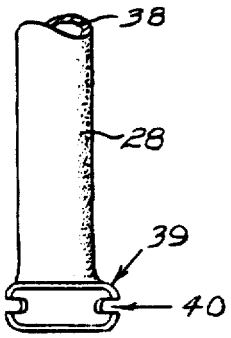
FIG. 5 is an end elevation of FIG. 4.

FIGS. 3, 4 and 5 illustrate in detail the configuration of the outlet tubes 28. Each outlet tube 28 has a cylindrical portion 38 which slopes downwardly and rearwardly as shown, the lower end being curved towards a more nearly horizontal discharge trajectory, and having the walls formed to be closer together to form an oval shaped discharge spout 39. The sides of the discharge spout 39 are cut away to provide side notches 40, and these combined with the high speed discharge through the nozzles, form a curtain of air which spreads effectively over most of the cutting platform 30, and is found to be more effective than a reel in moving the cut crop heads rearwardly to the auger 31. The discharge spouts 39 are usually located close to the upper surface of the cutting platform, and this assists in retaining the rearwardly moving curtain of air to move at a high speed across the platform without excessive dissipation.

*The outlet tubes curve and have flattened ends as shown so the flow path has substantially equal cross section throughout the length of the outlet tubes as can be seen in FIGS. 3, 4, and 5.*

The end spouts 39 are close to the respective ends of the cutter platform (not more than *7.9 inches or* 200 mm away), and the spacing between the spouts 39 does not exceed *11.8 inches or* 300 mm. This arrangement results in the air curtain being effective for a wide range of crop conditions.

In the embodiment shown, the device consumes between eight and ten horsepower to drive the high pressure blower 33, but this extra consumption of horsepower is more than offset by the great increase in speed at which the machine can operate; particularly in light or short crops and also by the increase in grain collection. In the illustrated embodiment, the machine in certain crops is found to operate at nearly double the speed of the same machine when fitted with a reel as standard equipment.

The use of the high velocity air over the cutting platform coupled with the continuous air curtain which is obtained closer to the spouts than in previous embodiments plus the forward speed of the machine, so entrains air from forward and over the cutter bar that the crop moves rearwardly as it is cut, and particulate material separated by "shattering" still moves rearwardly over the platform and into the feed auger trough. Due to the continuous air curtain, the tendency of grain heads and/or individual kernels to lodge just behind the knife and fall over the front is greatly reduced.

I claim:

1. Improved pressure air manifold and outlets system for grain header or harvester cutting platform having a frame, a cutter bar assembly and a feed auger, comprising a manifold extending across and above the cutting platform, mounting means mounting the manifold to the frame, a plurality of outlet tubes depending from said manifold, each said outlet tube terminating in outlet means at its end above said cutter bar assembly and adjacent to the front edge thereof, each said outlet tube being directed to discharge in a generally rearward and lateral direction, and a blower, drive means coupled to the blower, and conduit means coupling said blower to said manifold and outlet means for providing a continuous curtain of air substantially across the cutting platform *each tube having substantially equal internal cross sectional size throughout its length to the outlet means.*

2. Improved system according to claim 1 wherein said mounting means comprise a pair of support arms projecting forward, one from each end of the cutting platform, pivot means joining the front ends of said arms to said manifold, further pivot means joining the rear ends of said arms to said header frame, and elevating means coupling at least one of said arms to said header frame.

3. Improved system according to claim 2 comprising a pair of arms projecting forward one from each end of the cutting platform, and further pivot means joining the front ends of said further arms to said manifold and the rear ends of said further arms to the header frame, said arms at each end being spaced one above the other.

4. Improved system according to either claim 1 or claim 2 wherein each said outlet tube terminates in a discharge spout having notches in its side walls arranged to discharge some air in a generally rearward direction having however a lateral component.

5. Improved system according to claim 1 wherein said manifold has at least one flat side which extends substantially vertically.

6. Improved system according to claim 1 wherein said manifold has a plurality of sleeves depending therefrom, the upper end of each said outlet tube being retained in a respective said sleeve.

7. Improved system according to claim 6 wherein each said sleeve contains a tapered thread which is threadably engaged by the upper end of a respective said outlet tube, each said outlet tube being oriented to provide an initial lateral component of movement.

8. Improved system according to claim 1 wherein the lower end of each said outlet tube terminates close to said cutter bar assembly.

9. Improved system according to claim 1 wherein said blower drive means is operable to drive said blower to provide an air pressure in said manifold of at least 300 mm water head.

10. Improved system according to claim 1 or claim 8 wherein said blower drive means is operable to drive said blower to provide an air pressure in said manifold of at least 400 mm water head.

*11. An improved pressure air manifold and outlets system for grain header or harvester cutting platform having a frame, a cutter bar assembly and a feed auger, comprising:*

*a manifold extending across and above the cutting platform;*

*mounting means mounting the manifold to the frame, a plurality of outlet tubes depending from said manifold, each said outlet tube terminating at an outlet end above said cutter bar assembly and adjacent to the front edge thereof, each said outlet tube being partially flattened and provided with discharge openings which face both rearwardly and laterally to discharge air from the outlet tube in a generally rearward and lateral direction, each outlet tube having substantially equal cross sectional size throughout its effective length; and*

*a blower, drive means coupled to the blower, and conduit means coupling said blower to said manifold, to provide a flow of air through said outlet tubes to the outer ends thereof;*

*the pressure of the air and the means forming the discharge openings of the outlet ends of said outlet tubes combining to provide a continuity of flow volume from the outlet tubes for providing a continuous curtain of air substantially across the cutting platform.*

*12. An improved system in accordance with claim 11 in which the spacing between the outlet tubes is less than twelve inches.*

*13. An improved system in accordance with claim 11 in which the discharge openings at the end of each outlet tube consist of a rearwardly directed opening and two laterally directed openings.*

*14. An improved system in accordance with claim 11 in which the blower is driven by the drive means at a speed such that the discharge speed of the air from the outlet tubes exceeds 130 feet per second.*

*15. An improved system in accordance with claim 11 in which the spacing between the outlet tubes is less than twelve inches and in which the blower is driven by the drive means at a speed such that the discharge speed of the air from the outlet tubes exceeds 130 feet per second.*

*16. An improved system in accordance with claim 11 in which the manifold has a plurality of sleeves, the upper end of each said outlet tube being retained in the respective said sleeve.*

*17. An improved system in accordance with claim 11 in which the outlet end of each outlet tube terminates at a distance from the cutter platform which does not exceed eight inches.*

*18. In an improved pressure air manifold and outlet system for a grain header or harvester cutting platform which has a frame, a cutter bar assembly and a feed auger wherein the system is of the type which has a manifold extending across and above the cutting platform, mounting means mounting the manifold to the frame, a blower, drive means coupled to the blower to provide a selected air flow,*

*conduit means coupling said blower to said manifold and a plurality of air outlet tubes depending from said manifold with each air outlet tube terminating at its outlet end above said cutter bar assembly and adjacent to the front edge thereof, the improvement which comprises;*

*each air outlet tube being continuous and curved rearwardly to an outlet end, each air outlet tube being partially flattened at its outlet end and provided with discharge openings which face both rearwardly and laterally to discharge in a generally rearward and lateral direction, each tube having substantially equal cross sectional size throughout its effective length so that at the selected air flow the discharge openings at the outlet ends of said air outlet tubes provide a continuous curtain of air substantially across the cutting platform.*

*19. An improved system in accordance with claim 18 in which the spacing between the outlet tubes is less than twelve inches.*

*20. An improved system in accordance with claim 18 in which the blower is driven by the drive means at a speed such that the discharge speed of the air from the outlet tubes exceeds 130 feet per second.*

*21. An improved system in accordance with claim 18 in which the manifold has a plurality of sleeves, the upper end of each said outlet tube being retained in the respective said sleeve.*

* * * * *

UNITED STATES PATENT AND TRADEMARK OFFICE

CERTIFICATE OF CORRECTION

PATENT NO. : Re. 32,679

DATED : May 31, 1988

INVENTOR(S) : Donald G. Brooks

It is certified that error appears in the above-identified patent and that said Letters Patent is hereby corrected as shown below:

On the front page of the patent, in the References Cited section, after "FOREIGN PATENT DOCUMENTS", please add the following references:

--OTHER PUBLICATIONS

Brochure of Wind-Reel Division of Dunbar Kapple Inc., Geneva, Illinois (1956) entitled "Harvest up to 10 more bushels per acre with the...Phillips Wind-Reel."

"Exhibit B - Nine photographs of vertical pipes from a Phillips WIND-REEL attachment for Combine Harvesters made by the Wind-Reel Division of Dunbar Kapple Inc. of Geneva, Illinois, and sold in approximately 1959", Exhibit B to Reissue Application filed September 26, 1985, 3 pages.--

Signed and Sealed this

Twenty-first Day of March, 1989

*Attest:*

*Attesting Officer*

DONALD J. QUIGG

*Commissioner of Patents and Trademarks*